United States Patent [19]

Smith-Haddon

[11] Patent Number: 5,498,328
[45] Date of Patent: Mar. 12, 1996

[54] APPARATUS FOR SELECTIVELY SAMPLING FILTER BACKWASH FLUID

[75] Inventor: William F. Smith-Haddon, Chepstow, United Kingdom

[73] Assignee: Cross Manufacturing Company (1938) Limited, Bath, United Kingdom

[21] Appl. No.: 157,139

[22] PCT Filed: Jun. 17, 1992

[86] PCT No.: PCT/GB92/01081

§ 371 Date: Dec. 7, 1993

§ 102(e) Date: Dec. 7, 1993

[87] PCT Pub. No.: WO92/22373

PCT Pub. Date: Dec. 23, 1992

[30] Foreign Application Priority Data

Jun. 18, 1991 [GB] United Kingdom ............... 9113150

[51] Int. Cl.$^6$ ................................................ B01D 35/143
[52] U.S. Cl. ................... 210/85; 55/270; 73/61.68; 210/96.1; 210/108; 210/143; 210/418
[58] Field of Search ..................... 210/85, 87, 90, 210/93, 96.1, 96.2, 97, 108, 143, 257.1, 257.2, 739, 741, 418, 138, 424, 333.01, 411; 73/61.41, 61.56, 61.67, 61.68, 61.78; 422/101, 105; 436/39, 148; 55/270, 274

[56] References Cited

U.S. PATENT DOCUMENTS

| | | |
|---|---|---|
| 2,569,748 | 10/1951 | Grave . |
| 4,107,037 | 8/1978 | Cavanaugh et al. ............ 210/90 |
| 4,246,101 | 1/1981 | Selby ........................ 210/96.1 |
| 4,332,679 | 6/1982 | Hengst et al. ................ 210/90 |
| 4,676,914 | 6/1987 | Mills et al. ................. 210/108 |
| 4,765,963 | 8/1988 | Mukogawa et al. ............. 436/39 |
| 4,784,763 | 11/1988 | Hambleton et al. ............ 210/90 |
| 5,095,740 | 3/1992 | Hodgson et al. . |

FOREIGN PATENT DOCUMENTS

| | | | |
|---|---|---|---|
| 248732 | 12/1987 | European Pat. Off. | ........ 73/61.41 |
| 1132431 | 10/1968 | United Kingdom . | |

OTHER PUBLICATIONS

"Instrumentation and Automation Systems", Kawabe et al, Toshiba Review. No 133, May–Jun. 1981, pp. 5–13.
"Computer Control System for Water and Wastewater Treatment Plants", Hitachi Review vol. 27, Apr. 1978, No. 3, pp. 145–152, Kashiwagi et al.
"Process Control of the Grosshansdorf Waterworks", Stefan Muller, Siemens Review XLV (1978) No. 1 (Jan.), pp. 17–21.

*Primary Examiner*—Joseph W. Drodge
*Attorney, Agent, or Firm*—Young & Thompson

[57] ABSTRACT

This invention relates to monitoring apparatus and, in particular, but not exclusively to such apparatus for use in association with mains water supply facilities. A water works 10 has a water main 12, in which is located a filtration unit 13 having a filter 17. A pressure transducer 17a monitors the pressure drop across the filter 17 to initiate backwash. The conditions of backwash are monitored by a control unit 20 which operates valves 21 to 24 so that when abnormal conditions are detected a sample of the backwash fluid can be captured in reservoirs 25 to 27 in accordance with the degree of abnormality.

8 Claims, 1 Drawing Sheet

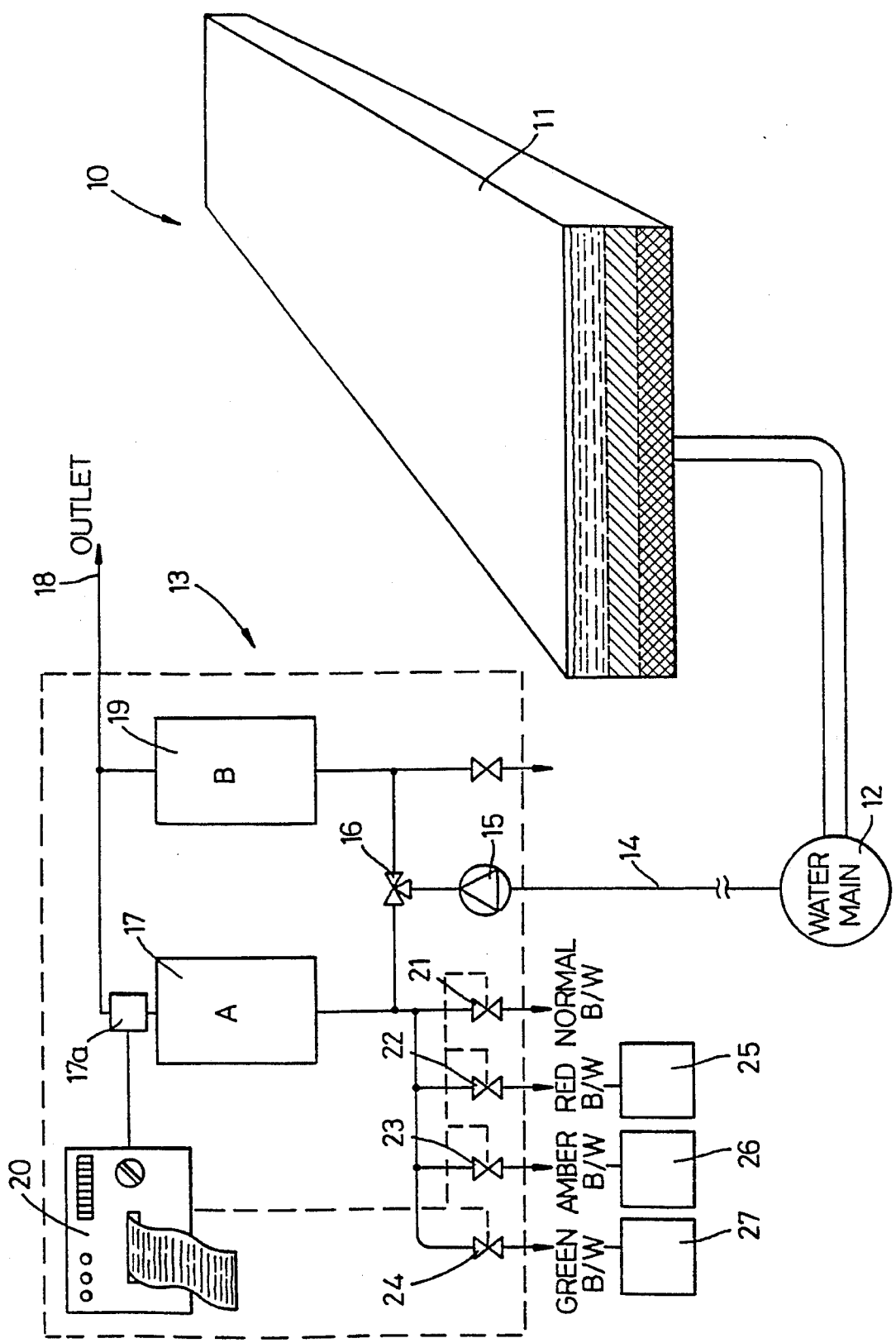

APPARATUS FOR SELECTIVELY SAMPLING FILTER BACKWASH FLUID

FIELD OF THE INVENTION

This invention relates to monitoring apparatus and, in particular, but not exclusively, to such apparatus for use in association with mains water supply facilities.

BACKGROUND OF THE INVENTION

There is ever increasing pressure on water companies to improve the quality of the water they supply and indeed any effluent they discharge. Whilst there are many sophisticated monitoring systems for detecting a whole range of pollutants, many of these do not work in real time and so significant discharges can occur from treatment plants before the problem is discovered.

Very often a breakdown in the efficiency of the treatment plant filtration system is indicated by an increase in solids in the water, but to date there is no method of monitoring such contaminants unless their presence is in sufficient concentration to effect a change in turbidity and is thus detectable using a currently available instrument.

SUMMARY OF THE INVENTION

From one aspect the invention consists in apparatus for monitoring the level of solids in a fluid flow, comprising means for monitoring the level of contamination or blockage of a filter in the flow and for developing an output signal if the level falls outside a predetermined range and means, responsive to the output signal, for sampling the residue in the filter whenever an output signal is received.

Thus if the apparatus is used in conjunction with a filter positioned in the output of a water treatment plant or in a sampling bypass thereof, then the need to backwash within a short time or the need for frequent backwashing of that filter, or some other parameter, would indicate that an unusually high level of solids was present in the outlet water from the treatment plant. This could immediately give rise to an alarm and action could be taken to shut down the plant. The arrangement may have the additional benefit that the treated water is subjected to a final extra fine filtration providing an improvement in the quality of the output water if the total flow passes through the filter.

The output signal may also initiate an alarm and/or the recording of predetermined parameters. For example, a record may be kept of the time of backwash, the elapsed time since the previous backwash, the flow through the filter and/or the pressure drop across the filter. Conveniently that record can be a printout.

In a preferred embodiment the apparatus includes means for backwashing the filter, a normal backwash outlet and backwash sample reservoir and valve means, responsive to the presence and absence of an output signal, for directing the backwash fluid to either the reservoir or the outlet respectively in dependence on the presence or absence of the outlet signal.

In a further embodiment the monitoring means may develop a different output signal depending on in which of a plurality of predetermined ranges of levels the monitored level falls and wherein the sampling means characterises the sample by the nature of the output signal. In this case there may be a reservoir for each range and the valve means may be arranged to deliver the backwash fluid to that reservoir which corresponds to the output signal generated or to the normal outlet in the absence of an output signal.

The output signal could be the absence of a 'normal' signal or a change in level of that 'normal' signal.

It will be understood that by capturing at least a sample of the residue which caused the unusual blocking of the filter the invention provides a completely novel tool for the water engineer in allowing him to determine the nature and significance of the fault in the upstream plant and to balance supplies from a variety of sources.

From another aspect the invention consists in apparatus for monitoring the level of solids in a fluid flow and means for producing an alarm signal when that level exceeds a predetermined level.

From a further aspect the invention consists in filter backwash apparatus comprising means for automatically backwashing a filter in response to a predetermined pressure drop across the filter and means for monitoring the time elapsed since the last backwash and/or the frequency of backwash and for developing an output signal if the time and/or frequency fall within a predetermined range.

BRIEF DESCRIPTION OF THE DRAWING

The invention may be performed in various ways and a specific embodiment will now be described with reference to the accompanying drawing, which is a schematic diagram of a water supply system including filter backwash apparatus.

DETAILED DESCRIPTION OF THE INVENTION

Thus a water works, generally indicated at 10, has a large sand filter 11, or indeed any source, from which water is supplied into a water main 12. Before the water is passed to the consumer it can be fed through a monitoring unit 13, or possibly more usually, the monitoring unit 13 may continuously or intermittently sample the water in the main, if its object is simply to act as a monitoring system. Thus water from the main is drawn along a pipe 14 by a pump 15 and is fed through a change-over valve 16 to a filter 17. In normal operation the water passes through the filter 17 to an outlet 18.

As is well known in the filtration art, the pressure drop across the filter elements in the filter A may be monitored, for example by pressure transducer 17a, and when this pressure drop indicates a significant build up of solid material on the filter elements, the filter 17 can be backwashed automatically by passing clean water through the filter 17 in a reverse direction.

A particularly convenient arrangement for achieving this is shown in the drawing. Thus the apparatus includes a further filter 19 which, when backwash is required, can take a supply from the pump 15 via the valve 16 and feed it in a reverse direction through the filter 17 so as to backwash it. This filtering of the backwash water prevents a build up of material on the wrong side of the elements of the filter A.

In normal operation the indication of the need to backwash is noted by a control unit 20 which in turn opens a valve 22 allowing the backwash fluid to pass into a drain. The control unit 20 also records the time and date at which that backwash occurs. When the apparatus subsequently passes into backwash, the control unit 20 calculates the time which has elapsed since the previous backwash and in dependence on that time determines the destination of the backwash fluid with its charge of contaminants.

This is achieved by providing a further three valves 22, 23 and 24 and selecting which of the valves 21 to 24 will be opened. As has already been mentioned, if 21 is opened the liquid simply passes to drain. If, however, one of the other valves is opened then the liquid passes into a respective reservoir 25 to 27. The selection of which valve 22 to 24 is opened can be made dependent on the time which has elapsed since the previous backwash. Thus if, for example, less than four minutes had elapsed valve 22 might be operated and a red alert warning alarm could be sounded. Similarly if the backwash occurs between four and thirty minutes from the previous backwash valve 23 may be opened and an amber warning could be given. If the backwash falls within the range thirty or sixty minutes then valve 24 may be opened and a green warning could be given. Otherwise valve 21 is opened. Initial experiments have shown that these time ranges are viable, but other time ranges may also be useful. It will be understood that other sampling means may be used which capture all or a part of the residue backwash from the filter 17. The above described arrangement is, however, preferred because it prevents contaminated backwash fluid re-entering the supply system.

Thus the arrangement gives the water engineer an immediate indication of the level of the problem and also a sample of the material which has actually resulted in the warning being given. Further if the problem builds up over time he may have a profile of samples in the reservoirs as backwash becomes more frequent. This may particularly assist the engineer in charge in selecting his sources of water at any one time.

It is preferred that the control unit 20 also provides a written printout 28 giving details of each and every backwash.

It will be understood that other parameters, other than elapsed time, can be used to produce a similar indication of rate of solid build up in the filter A, for example frequency of backwash or the pressure drop across the filter elements. Another possible parameter is the power consumption, or a factor hereof, of the pump 15. This will drop as the filter becomes blocked. It will further be understood that warnings may be visual, aural or any other suitable type. Other sampling arrangements may also be used. For example the backwash fluid may be diverted through another filter if an 'alert' condition is detected.

Finally it will be appreciated that for the apparatus to be particularly effective, the filter elements and indeed the whole filter apparatus 17 desirably operates in a highly repeatable manner, so that quite tight ranges can be set. A particularly suitable filter element is described in our International Patent Application No. PCT/GB90/01274.

The apparatus has been described in connection with water treatment. It will be understood that it is equally applicable to other installations where fluids which may contain contaminant solids need to be monitored.

I claim:

1. Apparatus operable for monitoring the level of solids in a fluid flow, comprising means for monitoring the level of contamination of a filter in the flow and for developing an output signal if the level falls outside a predetermined range, means responsive to the output signal for sampling a sample residue in the filter whenever an output signal is received, means for backwashing the filter with a backwashing fluid, and a backwash outlet, said sampling means including a backwash sample reservoir and valve means, responsive to the presence of the output signal, for selectively directing backwash fluid that has backwashed the filter to either the backwash sample reservoir or the backwash outlet respectively in dependence on the presence or absence of the output signal.

2. Apparatus as claimed in claim 1, wherein the monitoring means includes means for developing a selected one of different output signals to constitute said output signal depending upon in which range of a plurality of ranges of level of contamination, the monitored level falls, and wherein the sampling means characterizes the sample by the nature of the output signal.

3. Apparatus as claimed in claim 2, further comprising a reservoir for each of said ranges, and wherein the valve means are arranged to deliver the sample to the reservoir corresponding to the respective one of signals developed or to the backwash outlet in the absence of an output signal.

4. Apparatus as claimed in claim 1, wherein the means for backwashing automatically backwashes the filter in response to a predetermined pressure drop across the filter, and the monitoring means further includes means for monitoring at least one of the time elapsed since the filter was last backwashed and the frequency of backwash.

5. Apparatus as claimed in claim 1, wherein the output signal initiates an alarm.

6. Apparatus as claimed in claim 1, wherein the output signal initiates a record of predetermined parameters.

7. Apparatus as claimed in claim 6, wherein the parameters include one or more of backwash time, elapsed time since a previous backwash, flow through the filter or pressure drop across the filter.

8. Apparatus as claimed in claim 6, wherein the record is a printout.

* * * * *